United States Patent [19]

Matsuo

[11] Patent Number: 5,570,899
[45] Date of Patent: Nov. 5, 1996

[54] AIR BAG DEVICE FOR PROTECTING AN OCCUPANT

[75] Inventor: Yasuhiro Matsuo, Shiga, Japan

[73] Assignee: Takata Corporation, Tokyo, Japan

[21] Appl. No.: 489,288

[22] Filed: Jun. 9, 1995

[30] Foreign Application Priority Data

Jun. 13, 1994 [JP] Japan .................................. 6-130332

[51] Int. Cl.[6] .................................................. B60R 21/16
[52] U.S. Cl. ........................................ 280/728.2; 280/731
[58] Field of Search ............................... 280/728.2, 743.1, 280/731, 732

[56] References Cited

U.S. PATENT DOCUMENTS

| | | | |
|---|---|---|---|
| 5,193,846 | 3/1993 | Allard | 280/728.2 |
| 5,263,738 | 11/1993 | Oda et al. | 280/728.2 |
| 5,308,110 | 5/1994 | Kokeguchi | 280/728.2 |
| 5,419,584 | 5/1995 | Halford | 280/728.2 |

*Primary Examiner*—Kenneth R. Rice
*Attorney, Agent, or Firm*—Kanesaka & Takeuchi

[57] ABSTRACT

An air bag mounting structure is formed of an air bag mounting plate having a through opening; an inflator disposed in the through opening and having a flange disposed under the air bag mounting plate around a periphery of the through opening; an air bag having a receiving opening in a rear portion thereof for receiving the inflator therein; and a mounting piece connected to a periphery of the receiving opening of the air bag. The mounting piece is disposed between a rear surface of the air bag mounting plate and an upper surface of the flange of the inflator. A fastening device passes through the air bag mounting plate, the mounting piece and the flange to connect the air bag mounting plate and the flange. The mounting piece is firmly fixed between the air bag mounting plate and the flange, while the inflator is attached to the air bag mounting plate.

7 Claims, 8 Drawing Sheets

AIR BAG DEVICE FOR PROTECTING AN OCCUPANT

FIELD OF THE INVENTION

The present invention relates to an air bag device, installed in a vehicle, for protecting an occupant. In particular, the present invention relates to a mounting structure wherein an air bag is mounted on an air bag mounting plate and to the air bag used for this mounting structure.

BACKGROUND OF THE INVENTION

In an emergency such as a collision, an air bag device which is disposed in front of a seat of a vehicle deploys an air bag by gas spouted from an inflator to protect an occupant.

Figure 5:
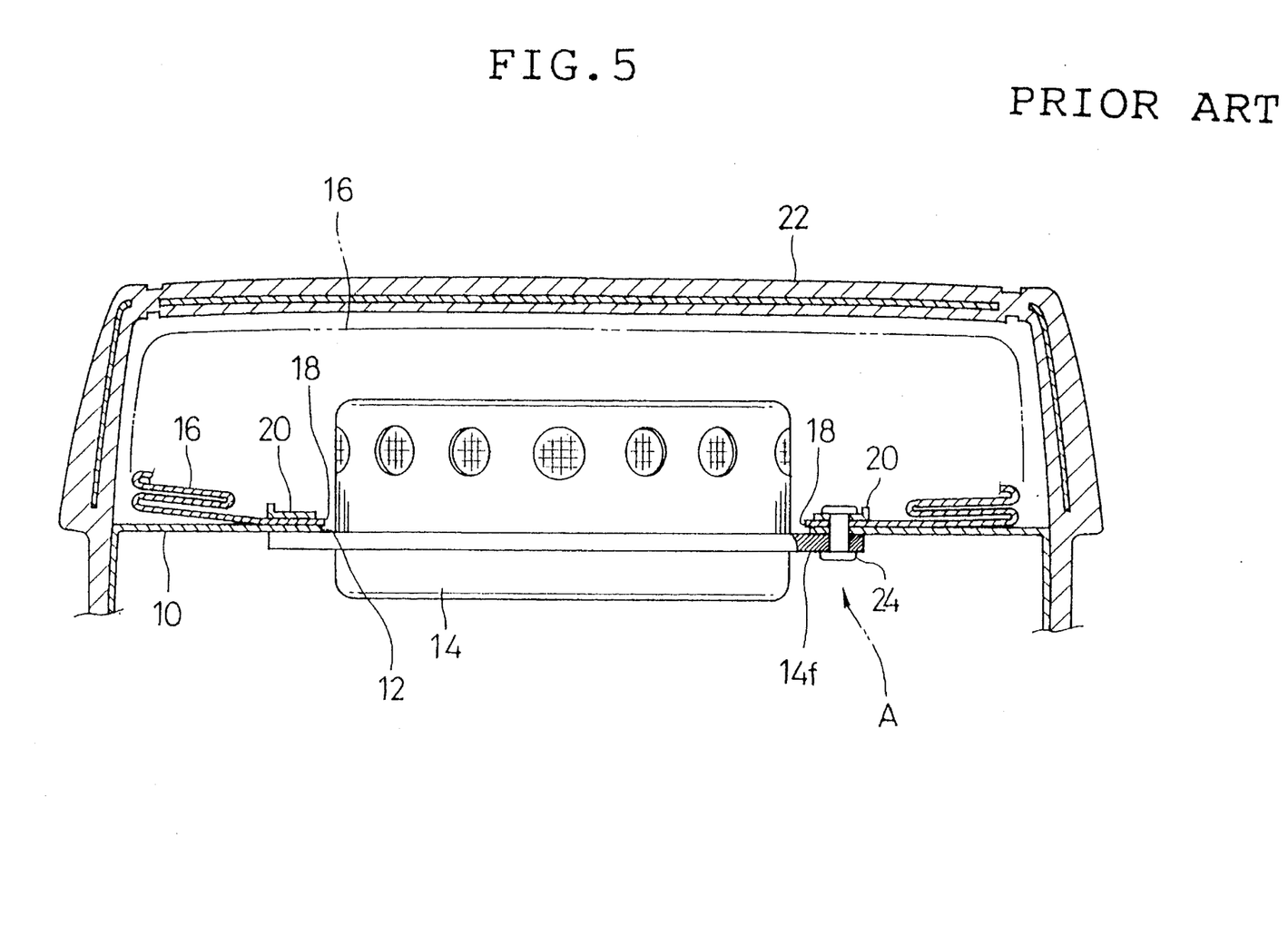
FIG. 5 is a sectional view showing an example of a conventional air bag device.
Figure 6:
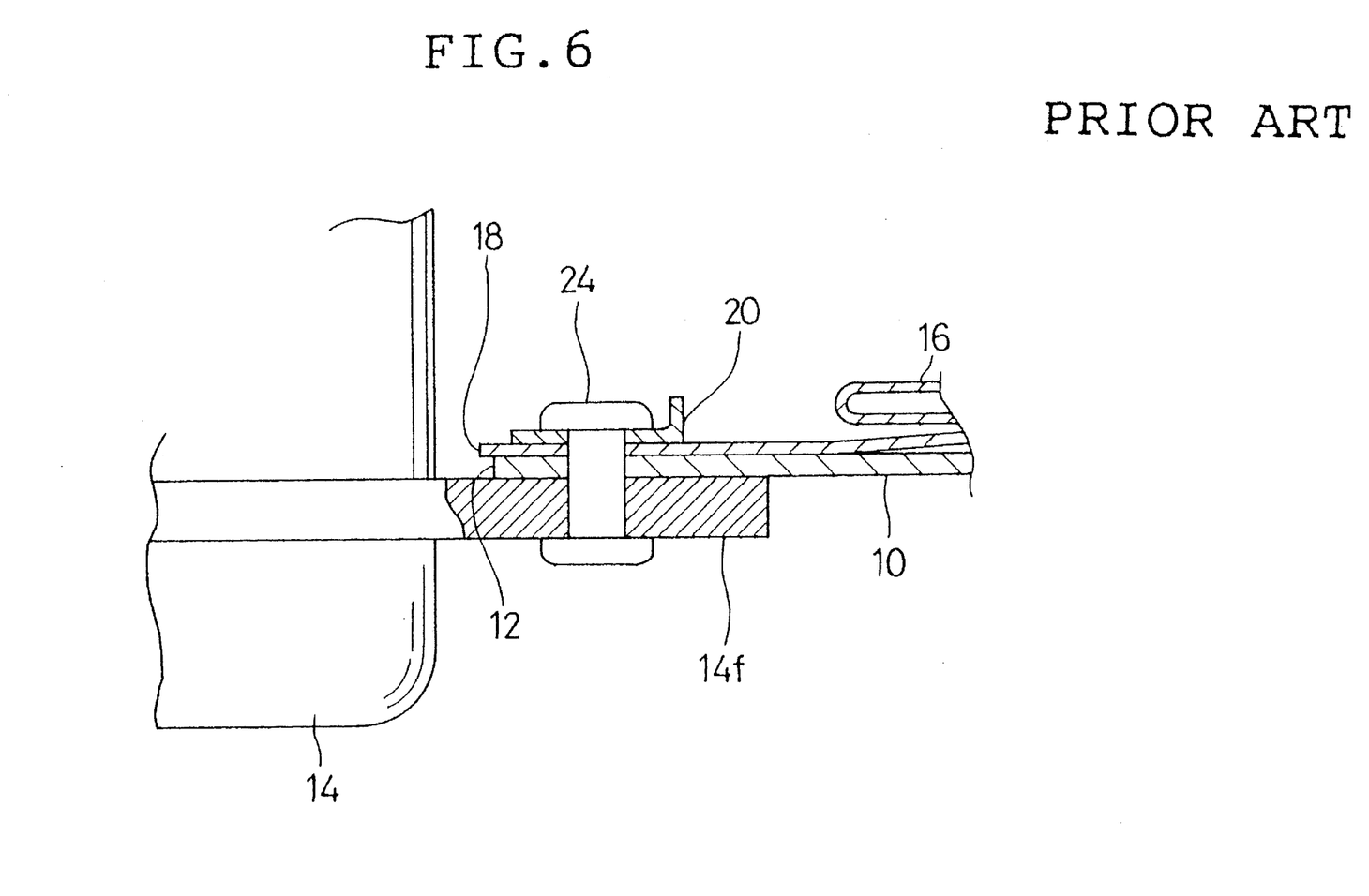
FIG. 6 is a fragmentary sectional view of an important portion of the example shown in FIG. 5.

FIG. 5 is a sectional view showing a conventional air bag device for protecting a driver and FIG. 6 is an enlarged sectional view of an A-portion of FIG. 5.

In these drawings, reference numeral 10 designates an air bag mounting plate, which is referred to as a retainer. The retainer 10 has an inflator mounting opening 12 in the center thereof where an inflator 14 is mounted.

An air bag 16 is provided with a receiving opening 18 for receiving an upper portion of the inflator 14. The receiving opening 18 is disposed around the periphery of the mounting opening 12. The periphery of the receiving opening 18 of the air bag 16 is held between a retaining ring 20 and the periphery of the mounting opening 12. A back of the retainer 10 is in contact with a flange 14f of the inflator 14. The retaining ring 20, the air bag 16, the retainer 10, and the flange 14f are pierced with rivets 24 so as to fix the air bag 16 to the retainer 10.

The air bag 16 is folded and is covered by a module cover 22. The module cover 22 is broken by a pressure of expansion of the air bag 16 when the air bag 16 is deployed by gas spouted from the inflator 14.

In the aforementioned mounting structure for an air bag of the conventional air bag device, the retaining ring 20 is required to hold the periphery of the receiving opening of the air bag, increasing cost for parts by this part.

OBJECT AND SUMMARY OF THE INVENTION

It is an object of the present invention to lower cost for parts by omitting the aforementioned retaining ring 20.

An air bag mounting structure of the present invention comprises: an air bag mounting plate having a through opening through which an inflator is inserted; an air bag which has a receiving opening in a rear portion thereof for receiving the inflator and is disposed on a surface of the air bag mounting plate, wherein a periphery of the receiving opening is attached to a periphery of the through opening of the air bag mounting plate; a mounting piece which is connected to the periphery of the receiving opening of the air bag and is disposed around the periphery of the through opening of the air bag mounting plate and on a rear surface of the air bag mounting plate; a flange of the inflator holding the mounting piece between the air bag mounting plate and the flange; and a fastening member piercing the air bag mounting plate, the mounting piece, and the flange to fasten them.

It is preferable that the mounting piece comprises at least one annular piece which is separate from the air bag, and an inner periphery of the annular piece is connected to the periphery of the receiving opening of the air bag.

An air bag of the present invention has a receiving opening in a rear portion thereof for receiving an inflator and comprises a mounting piece which is connected only to an edge of the receiving opening and spread along a periphery of the receiving opening in an outer surface of the air bag.

In the air bag mounting structure and the air bag of the present invention, the retaining ring for holding the periphery of the receiving opening of the air bag is not required.

DESCRIPTION OF THE PREFERRED EMBODIMENTS

Figure 1:
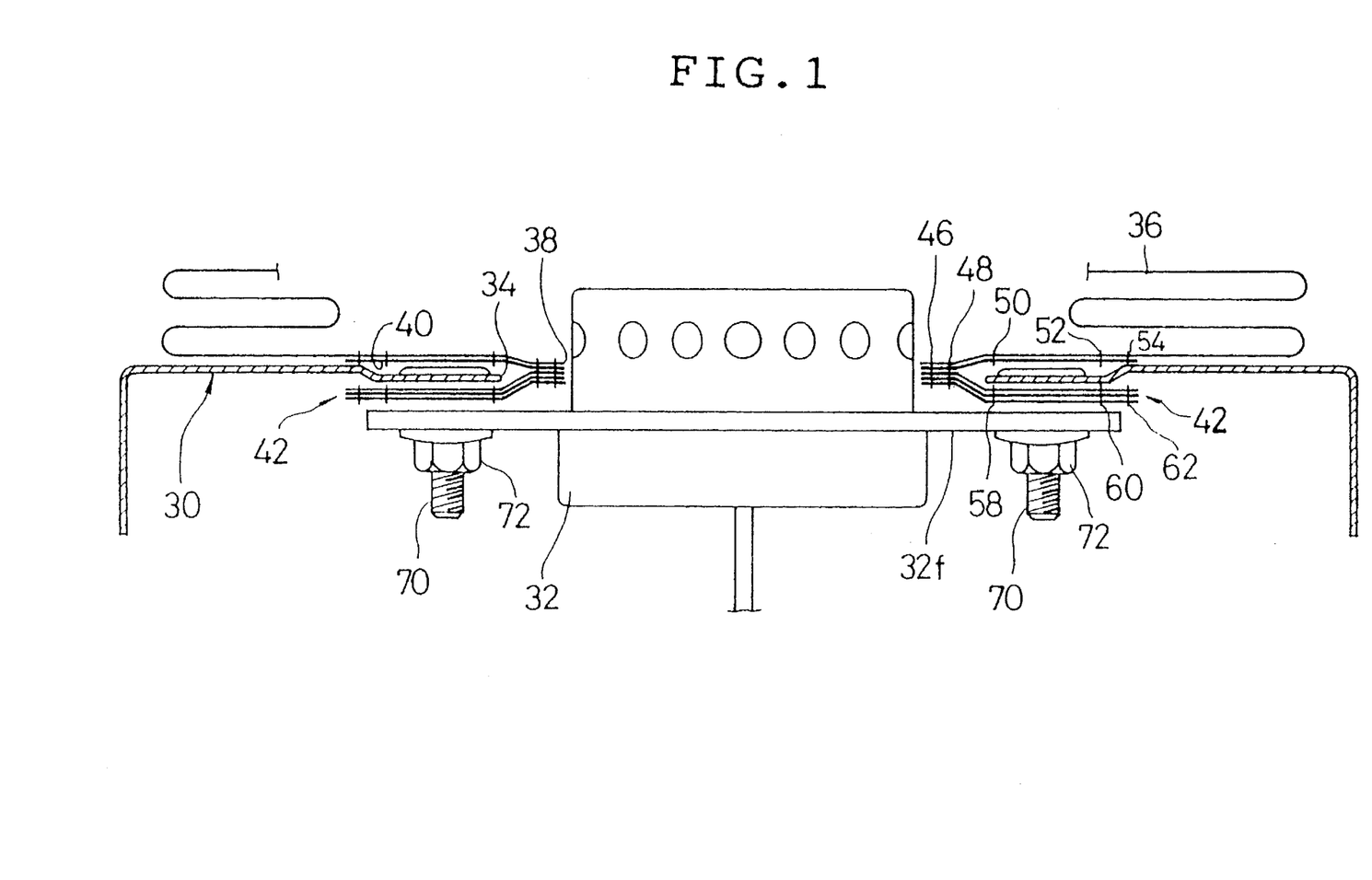
FIGS. 1 is a sectional view of a whole air bag device, showing a mounting structure for an air bag in accordance with an embodiment of the present invention.
Figure 2:
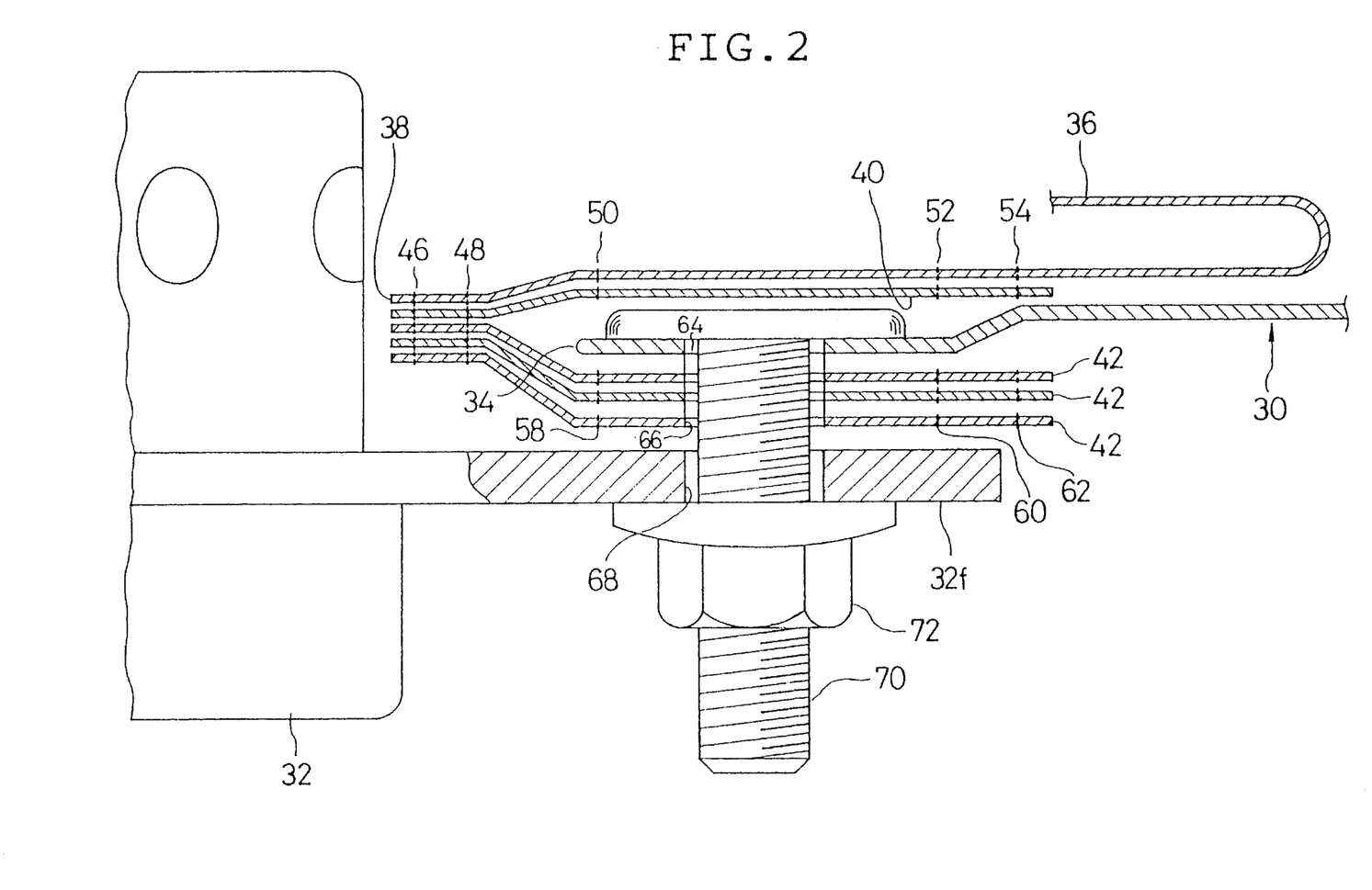
FIG. 2 is a partially enlarged view of the embodiment shown in FIG. 1.
Figure 3:
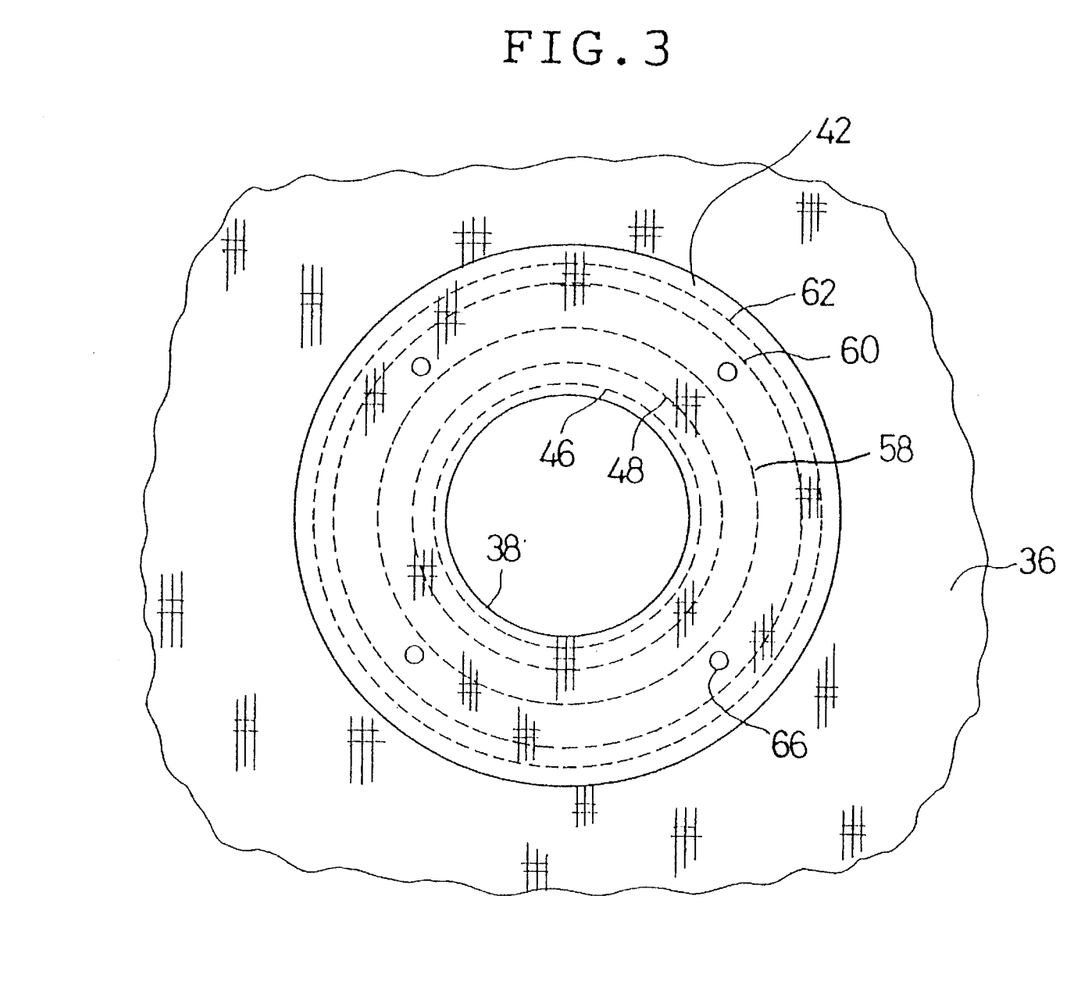
FIG. 3 is a plan view of a rear portion of the air bag shown in FIG. 1.

Hereinafter, embodiments of the present invention will be described in detail with reference to the drawings. FIGS. 1 is a sectional view of an air bag device in accordance with an embodiment of the present invention, FIG. 2 is an partially enlarged view thereof, and FIG. 3 is a plan view of a rear portion of an air bag of the air bag device.

A retainer 30 is provided with a through opening 34 for an inflator 32 in the center thereof. An air bag 36 is provided with a receiving opening 38 for the inflator 32 at the rear side thereof. The receiving opening 38 is sewn with a ring-like patch cloth (a reinforcing cloth) 40 and three annular pieces 42 together.

The patch cloth 40 is sewn on the air bag 36 by threads 46, 48, 50, 52, and 54 in concentric circles. The three annular pieces 42 are sewn together by threads 58, 60, and 62 in concentric circles so that they are integrated. The three annular pieces 42 are sewn on the air bag 36 by the threads 46 and 48 only around the inner periphery thereof.

The periphery of the through opening 34 of the retainer 30 is inserted between the annular pieces 42 and the air bag 36. A flange 32f of the inflator 32 is pressed against the annular pieces 42. The retainer 30, the annular pieces 42, and the flange 32f are provided with bolt through holes 64, 66, and 68, respectively. Bolts 70 enter into the bolt through holes 64, 66, and 68, respectively. Nuts 72 are screwed to the bolts 70, thereby securely connecting the air bag 36 to the retainer 30.

In the mounting structure for the air bag as mentioned above, a retaining ring is not required so that the number of parts for the air bag device is decreased. In addition, the annular pieces 42 are held between the flange 32f and the retainer 30 so that the connective strength of the air bag 36 to the retainer 30 is extremely high.

Figure 4:
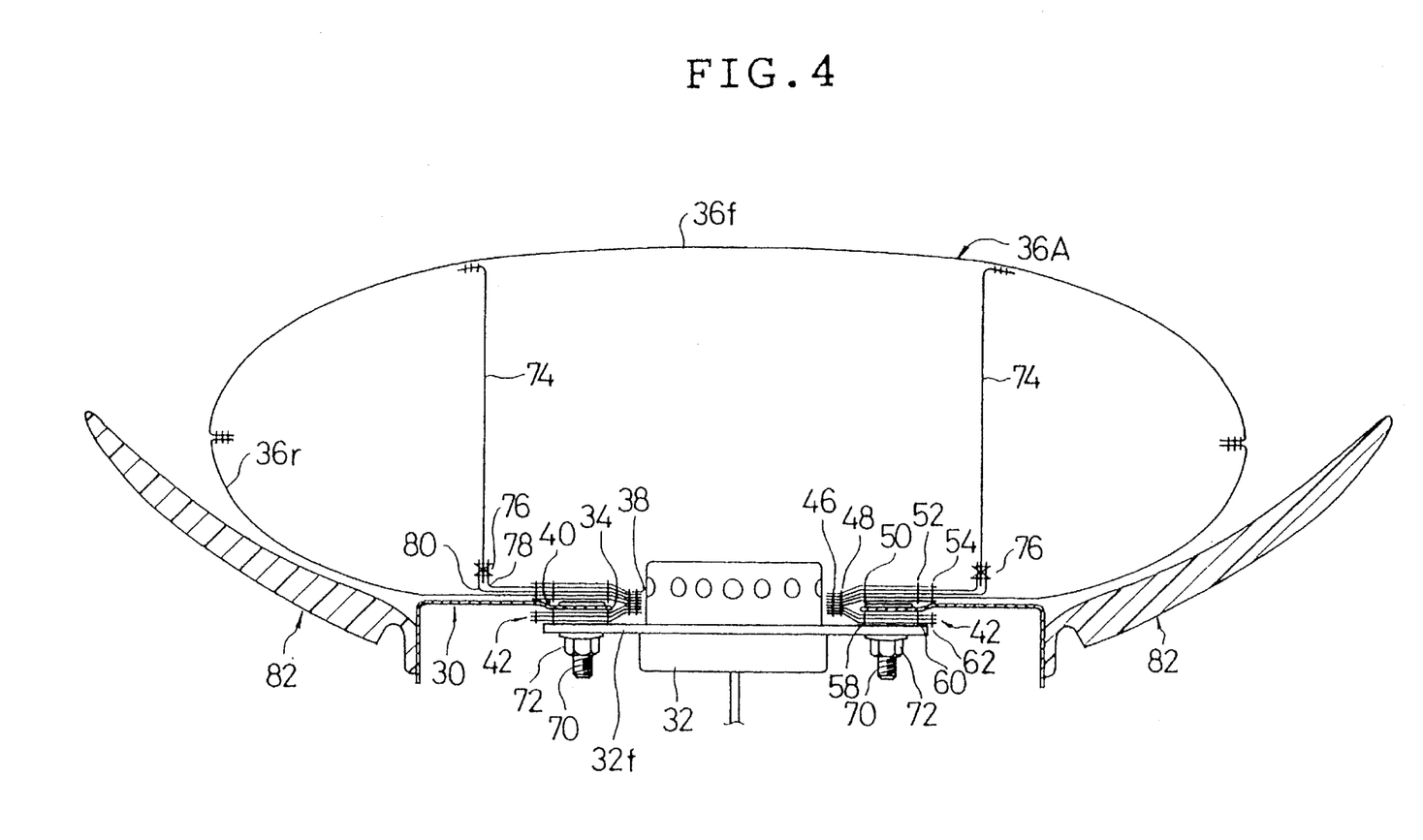
FIG. 4 is a sectional view showing a mounting structure of an alternative embodiment.

FIG. 4 is a sectional view showing a mounting structure for an air bag in accordance with an alternative embodiment of the present invention and showing an air bag 36A in its deployed state.

The air bag 36A is formed in a bag-like shape by sewing a circular front panel 36f and a circular rear panel 36r at the peripheries thereof. Tether belts 74 connect a portion near the receiving opening 38 of the rear panel 36r and a portion of the front panel 36f. The tether belts 74 are sewn on patch cloths 78 and 80 by threads 76. The patch cloths 78 and 80 are sewn on the air bag 36A by threads 46, 48, 50, 52, and 54. A numeral 82 designates a module cover. The other numerals in FIG. 4 designate the same parts in FIG. 1, respectively.

Figure 7:
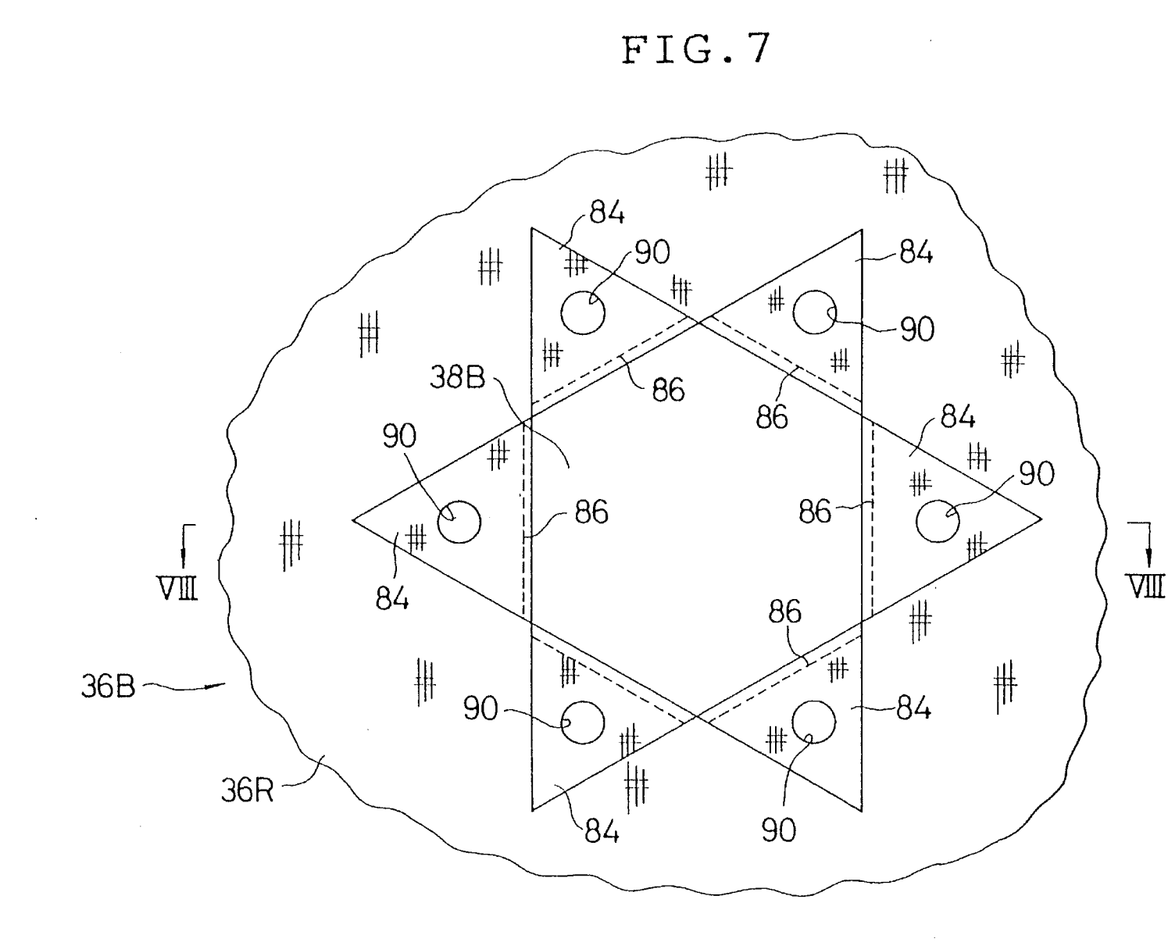
FIG. 7 is a fragmentary plan view showing a portion of an alternative embodiment.
Figure 8:
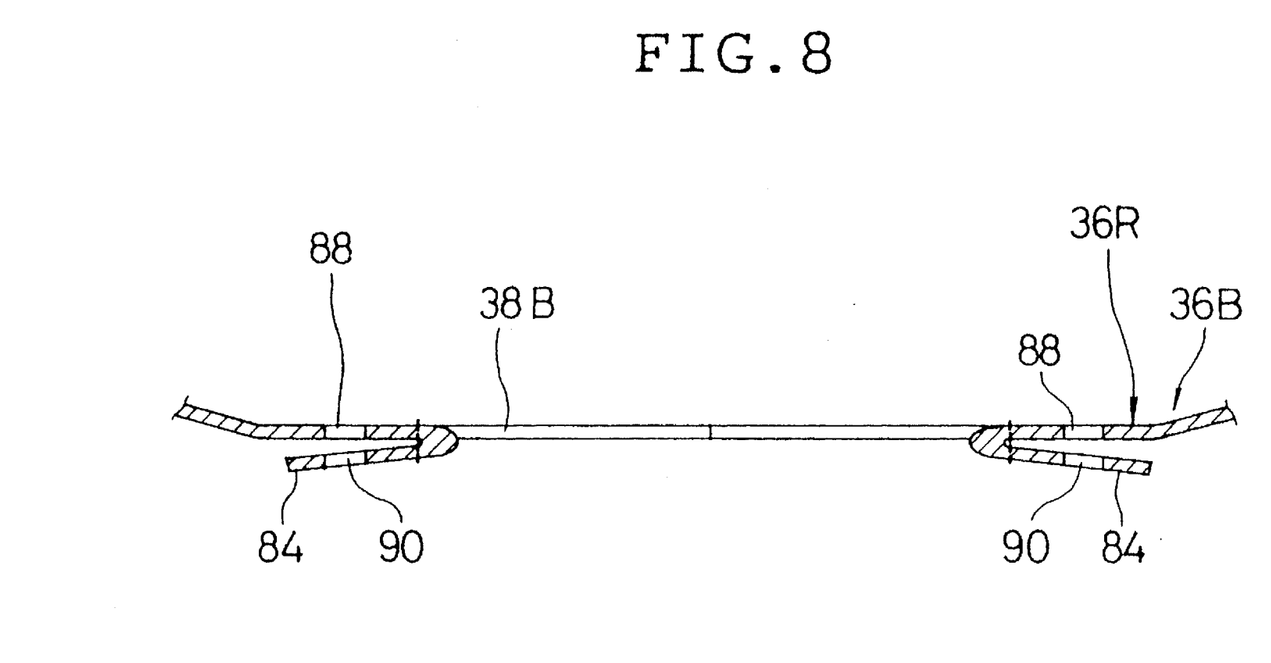
FIG. 8 is a sectional view taken along a line VIII—VIII of FIG. 7.

Though a mounting piece of the air bag is formed by sewing the annular pieces 42 on the air bag in the aforementioned embodiments, mounting pieces 84 may be formed by folding back ends around the receiving opening 38B of a rear panel 36R as shown in FIG. 7 and FIG. 8. The receiving opening 38B is hexagonal and the mounting pieces 84 are triangular. Each base portion of the mounting pieces 84 is sewn on the rear panel 36R by thread 86. Numerals 88 and 90 designate bolt through holes.

Though the bolts 70 are employed in the aforementioned embodiments, other fasteners such as rivets may be employed. As mentioned above, the air bag device and the mounting structure for the air bag of the present invention can mount the air bag to the air bag mounting plate without the retaining ring so that the number of parts for the air bag device is decreased, thereby lowering the cost for the parts.

What we claim is:

1. An air bag mounting structure comprising:

an air bag mounting plate having a through opening, an inflator disposed in the through opening, said inflator having a flange disposed under the air bag mounting plate around a periphery of the through opening;

an air bag having a receiving opening in a rear portion thereof for receiving said inflator therein, said air bag being disposed on a front surface of said air bag mounting plate;

a mounting piece connected to a periphery of said receiving opening of said air bag, said mounting piece being disposed between a rear surface of said air bag mounting plate and an upper surface of the flange of the inflator; and fastening means piercing the air bag mounting plate, the mounting piece and the flange, said fastening means connecting the air bag mounting plate and the flange so that the mounting piece is firmly fixed between the air bag mounting plate and the flange while the inflator is attached to the air bag mounting plate.

2. An air bag mounting structure as claimed in claim 1, wherein said mounting piece comprises at least one annular piece which is separate from said air bag, and an inner periphery of said annular piece is connected to the periphery of said receiving opening of said air bag.

3. An air bag mounting structure as claimed in claim 2, wherein said annular piece is made of a woven fabric and is sewn on said air bag.

4. An air bag mounting structure as claimed in claim 3, wherein said annular piece is directly held between said air bag mounting plate and said flange.

5. An air bag mounting structure as claimed in claim 1, wherein said through opening of the air bag mounting plate is larger than the inflator and smaller than the flange to form a space between the air bag mounting plate and the inflator, said mounting piece and the air bag being connected together in the space.

6. An air bag mounting structure as claimed in claim 5, further comprising a reinforcing cloth fixed to the periphery of the receiving opening of the air bag, said reinforcing cloth being directly placed on the fastening means and the periphery of the through opening of the air bag mounting plate when the air bag is assembled.

7. An air bag mounting structure comprising:

an air bag mounting plate having a through opening through which an inflator is inserted;

an air bag having a receiving opening in a rear portion thereof for receiving said inflator, a periphery of said receiving opening being attached to a periphery of said through opening of said air bag mounting plate, and said air bag being disposed on a front surface of said air bag mounting plate;

a mounting piece connected to the periphery of said receiving opening of said air bag, said mounting piece being disposed around the periphery of said through opening of said air bag mounting plate and on a rear surface of said air bag mounting plate, said mounting piece being formed of triangular pieces extending from said air bag and folded back along the periphery of said receiving opening;

a flange of an inflator, said mounting piece being held between said air bag mounting plate and said flange; and fastening means piercing the air bag mounting plate, the mounting piece, and the flange to fasten them.

\* \* \* \* \*